(12) United States Patent
Iwami et al.

(10) Patent No.: US 6,656,061 B2
(45) Date of Patent: Dec. 2, 2003

(54) SOLID GOLF BALL

(75) Inventors: Satoshi Iwami, Kobe (JP); Takashi Sasaki, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 10/161,648

(22) Filed: Jun. 5, 2002

(65) Prior Publication Data

US 2003/0092510 A1 May 15, 2003

(30) Foreign Application Priority Data

Jun. 5, 2001 (JP) ........................................ 2001-169725
Jul. 9, 2001 (JP) ........................................ 2001-207712

(51) Int. Cl.$^7$ ............................................... A63B 37/06
(52) U.S. Cl. ......................................................... 473/378
(58) Field of Search .................................. 473/351, 367, 473/368, 370, 371, 374, 376, 377, 378

(56) References Cited

U.S. PATENT DOCUMENTS

| | | | |
|---|---|---|---|
| 3,395,109 A | | 7/1968 | Molitor et al. |
| 3,989,568 A | | 11/1976 | Isaac |
| 4,123,061 A | | 10/1978 | Dusbiber |
| 4,248,432 A | | 2/1981 | Hewitt et al. |
| 4,884,814 A | | 12/1989 | Sullivan |
| 5,120,791 A | | 6/1992 | Sullivan |
| 5,184,828 A | * | 2/1993 | Kim et al. ................ 473/374 |
| 5,484,870 A | * | 1/1996 | Wu ............................ 528/28 |
| 5,848,943 A | | 12/1998 | Sano et al. |
| 5,929,189 A | | 7/1999 | Ichikawa et al. |
| 6,045,459 A | * | 4/2000 | Sugimoto et al. ........ 473/373 |
| 6,207,784 B1 | * | 3/2001 | Rajagopalan ............. 528/71 |
| 6,210,294 B1 | * | 4/2001 | Wu ............................ 473/377 |
| 6,251,991 B1 | | 6/2001 | Takesue et al. |

FOREIGN PATENT DOCUMENTS

| | | |
|---|---|---|
| EP | 0 467 622 A1 | 1/1992 |
| GB | 2278364 | 11/1994 |
| JP | 51-74726 | 6/1976 |
| JP | 5-3931 | 1/1993 |
| JP | 6-299052 | 10/1994 |
| JP | 6-327794 | 11/1994 |
| JP | 2662909 | 6/1997 |
| JP | 9-215775 | 8/1997 |
| JP | 2709950 | 10/1997 |
| JP | 9-271538 | 10/1997 |
| JP | 9-308708 | 12/1997 |
| JP | 11-128402 | 5/1999 |

* cited by examiner

Primary Examiner—Mark S. Graham
Assistant Examiner—Raeann Gordon
(74) Attorney, Agent, or Firm—Birch, Stewart, Kolasch & Birch, LLP.

(57) ABSTRACT

The present invention provides a solid golf ball having long flight distance obtained by accomplishing high launch angle and low spin amount, and having excellent shot feel, rebound characteristics, scuff resistance and yellowing resistance. The present invention relates to a solid golf ball comprising a core and a cover formed on the core, wherein
  the cover comprises as a base resin
  (a) polyurethane-based thermoplastic elastomer formed by using cycloaliphatic diisocyanate, or
  (b) a mixture of polyurethane-based thermoplastic elastomer formed by using cycloaliphatic diisocyanate and polyamide-based thermoplastic elastomer, and has a thickness of not more than 1.0 mm, and
  a surface hardness in Shore D hardness of the core is higher than a central point hardness in Shore D hardness of the core by not less than 20.

16 Claims, 2 Drawing Sheets

SOLID GOLF BALL

FIELD OF THE INVENTION

The present invention relates to a solid golf ball. More particularly, it relates to a solid golf ball having long flight distance obtained by accomplishing high launch angle and low spin amount, and having excellent shot feel, rebound characteristics, scuff resistance and yellowing resistance.

BACKGROUND OF THE INVENTION

Recently, ionomer resin has been widely used for cover material of golf balls. This is because the ionomer resin is superior in rebound characteristics, durability, productivity and the like. However, since the ionomer resin has high rigidity and hardness, there are problems that in the resulting golf ball, shot feel is hard and poor; and spin performance is not sufficiently obtained, which degrades controllability, when using ionomer resin as the cover material.

In order to improve the problems, it is attempted to soften the ionomer resin by various means. For example, it is proposed to blend the hard ionomer resin having high rigidity with terpolymer-based soft ionomer resin (Japanese Patent Kokai Publications No. 3931/1993, Japanese Patent No. 2709950 and the like) or blend the hard ionomer resin with thermoplastic elastomer (Japanese Patent Kokai Publications Nos. 299052/1994, 327794/1994 and the like) to soften the cover.

However, when good shot feel and spin performance are accomplished in case of the blend of the hard ionomer with the soft ionomer resin is used, rebound characteristics of the resulting golf ball are largely degraded. In addition, since the surface of the cover of the golf ball is easily abraded by grooves on a face surface of the golf club when hit by an iron club, it is problem that the surface of the golf ball becomes fluffy or begins to split finely, and scuff resistance is poor.

When the blend of the hard ionomer with the thermoplastic elastomer is used, rebound characteristics are excellent compared with the blend with the soft ionomer resin, but the compatibility between the both is poor, and scuff resistance when hit by an iron club is poor compared with the blend with the soft ionomer resin.

In order to solve the problems, it has been suggested to use thermosetting polyurethane composition (Japanese Patent Kokai publication Nos. 74726/1976, 241881/1992, U.S. Pat. No. 4,123,361 and the like), or polyurethane-based thermoplastic elastomer (U.S. Pat. Nos. 3,395,109, 4,248, 432, Japanese Patent Kokai publication Nos. 271538/1997, 1280401/1999, 1280402/1999 and the like) as a cover material of golf ball. When the thermosetting polyurethane composition is used for the cover material, the scuff resistance, which is problem from using the blend of the hard ionomer resin with the soft ionomer resin or thermoplastic elastomer, is excellent. However, since a process of coating a cover on a core is complicated, large-scale production is difficult, and the productivity is degraded.

When the polyurethane-based thermoplastic elastomer is used for the cover material, compared with the thermosetting polyurethane composition, the productivity is improved, but shot feel, controllability and rebound characteristics of the resulting golf ball are not sufficiently obtained. When polyurethane-based thermoplastic elastomer formed by using typical diisocyanates, such as 2,4-tolylene diisocyanate, 2,6-toylene diisocyanate or a mixture thereof (TDI), 4,4'-diphenylmethane diisocyanate (MDI) and the like, is used for the cover material, its strength is high, and scuff resistance of the resulting golf ball is excellent, but there is problem that yellowing is easy to occur, and it is required to further use white paint. In order to solve the problem, it has been suggested to use polyurethane-based thermoplastic elastomer formed by using aliphatic diisocyanate for the cover material (Japanese Patent Kokai publication No. 271538/1997). However, there is problem that its strength is low, and scuff resistance of the resulting golf ball is degraded, compared with the polyurethane-based thermoplastic elastomer formed by using aromatic diisocyanate.

OBJECTS OF THE INVENTION

A main object of the present invention is to provide a solid golf ball having long flight distance obtained by accomplishing high launch angle and low spin amount, and having excellent shot feel, rebound characteristics, scuff resistance and yellowing resistance.

According to the present invention, the object described above has been accomplished by using as a base resin of the cover (a) polyurethane-based thermoplastic elastomer formed by using cycloaliphatic diisocyanate, or (b) a mixture of polyurethane-based thermoplastic elastomer formed by using cycloaliphatic diisocyanate and polyamide-based thermoplastic elastomer, and by adjusting the thickness of the cover and hardness difference between the surface and central point of the core to specified ranges, thereby providing a solid golf ball having long flight distance obtained by accomplishing high launch angle and low spin amount, and having excellent shot feel, rebound characteristics, scuff resistance and yellowing resistance.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accompanying drawings which are given by way of illustration only, and thus are not limitative of the present invention, and wherein.

SUMMARY OF THE INVENTION

The present invention relates to a solid golf ball comprising a core and a cover formed on the core, wherein
the cover comprises as a base resin
(a) polyurethane-based thermoplastic elastomer formed by using cycloaliphatic diisocyanate, or
(b) a mixture of polyurethane-based thermoplastic elastomer formed by using cycloaliphatic diisocyanate and polyamide-based thermoplastic elastomer, and has a thickness of not more than 1.0 mm, and
a surface hardness in Shore D hardness of the core is higher than a central point hardness in Shore D hardness of the core by not less than 20.

In another embodiment, the present invention relates to a solid golf ball comprising a core composed of a center and at least one layer of an intermediate layer formed on the center, and a cover formed on the core, wherein the cover comprises as a base resin
(a) polyurethane-based thermoplastic elastomer formed by using cycloaliphatic diisocyanate, or
(b) a mixture of polyurethane-based thermoplastic elastomer formed by using cycloaliphatic diisocyanate and polyamide-based thermoplastic elastomer, and has a thickness of not more than 1.0 mm, a surface hardness in Shore D hardness of the center is higher than a central point hardness in Shore D hardness of the center by not less than 15, a surface hardness in Shore D hardness of the core is higher than the central point hardness of the center by not less than 20, and the surface hardness of the core is higher than the surface hardness of the center.

In order to put the present invention into a more suitable practical application, it is desired that the cycloaliphatic diisocyanate be at least one selected from the group consisting of 4,4'-dicyclohexylmethane diisocyanate, 1,3-bis (isocyanatomethyl)cyclohexane, isophorone diisocyanate, and trans-1,4-cyclohexane diisocyanate; and the cover have a Shore D hardness of 35 to 60 and a deformation amount when applying from an initial load of 98 N to a final load of 1275 N of 2.50 to 3.20 mm.

DETAILED DESCRIPTION OF THE INVENTION

Figure 1:
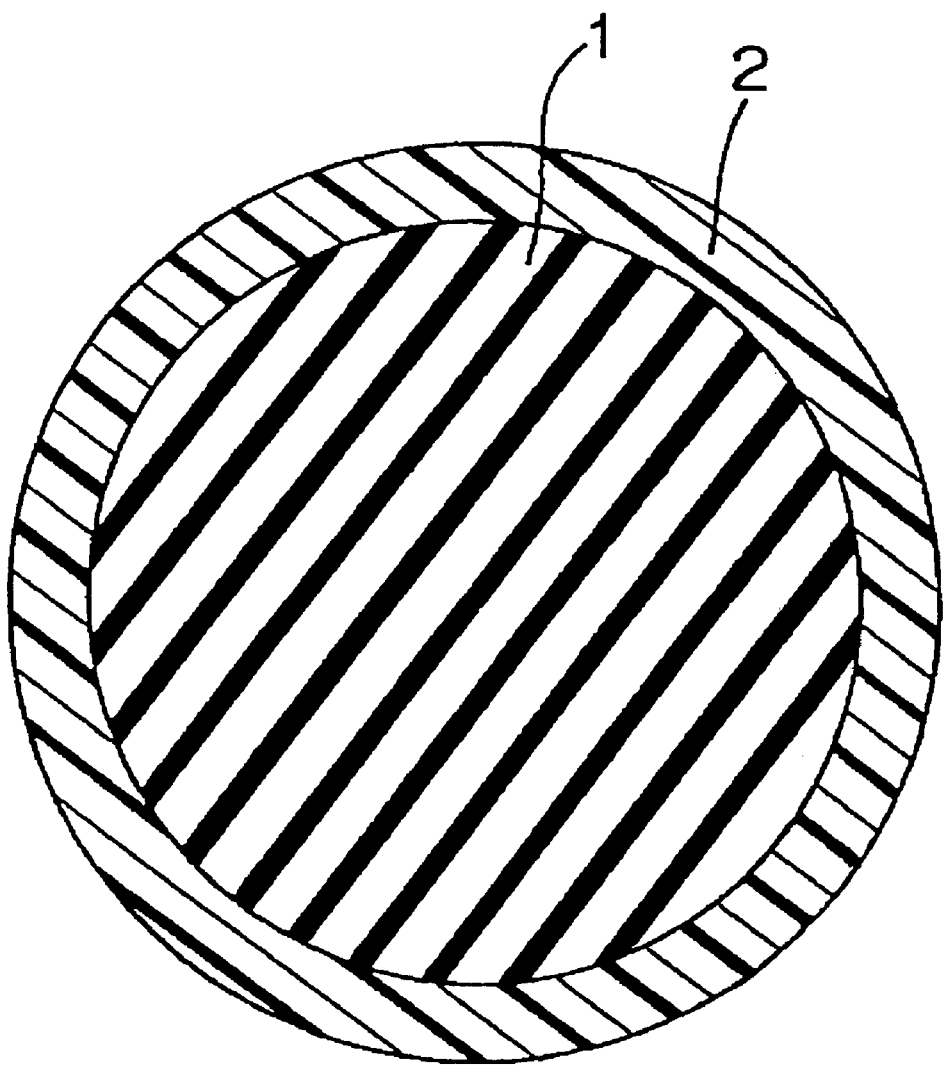
FIG. 1 is a schematic cross section illustrating one embodiment of the golf ball of the present invention.

The solid golf ball of the present invention will be explained with reference to the accompanying drawing in detail. FIG. 1 is a schematic cross section illustrating one embodiment of the solid golf ball of the present invention. As shown in FIG. 1, the golf ball of the present invention comprises a core 1 and a cover 2 formed on the core. The core of the golf ball of the present invention is obtained by press-molding a rubber composition under applied heat. The rubber composition comprises a base rubber, a co-crosslinking agent, an organic peroxide, a filler and the like. In the golf ball of the present invention, the core 1 may have a single-layered structure or multi-layered structure, which has two or more layers.

The base rubber used in the present invention may be synthetic rubber, which has been conventionally used for cores of solid golf balls. Preferred is so-called high-cis polybutadiene rubber containing a cis-1, 4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent is not limited, but includes a metal salt of α,β-unsaturated carboxylic acid, including mono or divalent metal salts, such as zinc or magnesium salts of α,β-unsaturated carboxylic acids having 3 to 8 carbon atoms (e.g. acrylic acid, methacrylic acid, etc.), or a blend of the metal salt of α,β-unsaturated carboxylic acid and acrylic ester or methacrylic ester and the like. The preferred co-crosslinking agent is zinc acrylate, because it imparts high rebound characteristics to the resulting golf ball. The amount of the co-crosslinking agent is preferably from 15 to 50 parts by weight, more preferably from 20 to 40 parts by weight, based on 100 parts by weight of the base rubber. When the amount of the co-crosslinking agent is larger than 50 parts by weight, the core is too hard, and the shot feel of the resulting golf ball is poor. On the other hand, when the amount of the co-crosslinking agent is smaller than 10 parts by weight, the center is too soft, and it is required to increase the amount of the organic peroxide in order to impart a desired hardness to the core. Therefore, the rebound characteristics are degraded, which reduces the flight distance.

The organic peroxide, which acts as a crosslinking agent or curing agent, includes, for example, dicumyl peroxide, 1,1-bis (t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide is preferably from 0.3 to 3.0 parts by weight, more preferably from 0.4 to 2.0 parts by weight, based on 100 parts by weight of the base rubber. When the amount of the organic peroxide is smaller than 0.3 parts by weight, the core is too soft, and the rebound characteristics of the resulting golf ball are degraded, which reduces the flight distance. On the other hand, when the amount of the organic peroxide is larger than 3.0 parts by weight, the core is too hard, and it is required to decrease the amount of the co-crosslinking agent in order to impart a desired hardness to the core. Therefore, the rebound characteristics are degraded, which reduces the flight distance.

The filler, which can be typically used for the core of solid golf ball, includes, for example, inorganic filler (such as zinc oxide, barium sulfate, calcium carbonate and the like), high specific gravity metal powder filler (such as tungsten powder, molybdenum powder and the like), and the mixture thereof. The amount of the filler is from 2 to 50 parts by weight, preferably from 3 to 35 parts by weight, based on 100 parts by weight of the base rubber. When the amount of the filler is smaller than 2 parts by weight, it is difficult to adjust the specific gravity of the resulting golf ball, and a proper weight of the resulting golf ball is not sufficiently obtained. On the other hand, when the amount of the filler is larger than 50 parts by weight, the weight ratio of the rubber component in the core is small, and the rebound characteristics are degraded.

The rubber composition for the core of the golf ball of the present invention can contain other components, which have been conventionally used for preparing the core of solid golf balls, such as organic sulfide compound, antioxidant, peptizing agent and the like. If used, the amount of the antioxidant is preferably 0.1 to 1.0 parts by weight, and the amount of the peptizing agent is preferably 0.1 to 5.0 parts by weight, based on 100 parts by weight of the base rubber.

The core 1 is obtained by mixing the above rubber composition, and then vulcanizing and press-molding the mixture in a mold. The vulcanization may be conducted, for example, by press molding in a mold at 130 to 180° C. and 2.9 to 11.8 MPa for 10 to 50 minutes.

It is desired that the core 1 of the golf ball of the present invention have a diameter of 40.8 to 42.2 mm, preferably 40.8 to 42.0 mm, more preferably 41.0 to 41.8 mm. When the diameter of the core is smaller than 40.8 mm, the cover is thick, and the rebound characteristics are degraded. On the other hand, when the diameter is larger than 42.2 mm, the thickness of the cover is too thin, and the technical effects accomplished by the presence of the cover is not sufficiently obtained. In addition, it is difficult to mold it.

In the golf ball of the present invention, it is desired for the core 1 to have a deformation amount when applying from an initial load of 98 N to a final load of 1275 N of 2.50 to 3.20 mm, preferably 2.60 to 3.10 mm, more preferably 2.70 to 3.00 mm. When the deformation amount is smaller than 2.50 mm, the core is too hard, and the shot feel of the resulting golf ball is hard and poor. On the other hand, when the deformation amount is larger than 3.20 mm, the core is too soft, and the shot feel of the resulting golf ball is heavy and poor.

Generally, when the hardness difference between the surface and central point of the core is large, the launch angle is high and the spin amount is low as an important factor of flight performance, and the flight distance is improved. In the golf ball of the present invention, it is required for a surface hardness in Shore D hardness of the core 1 be higher than a central point hardness in Shore D hardness of the core 1 by not less than 20, and the hardness difference is within the range of preferably 20 to 40, more preferably 25 to 35. When the hardness difference is lower than 20, high launch angle and low spin amount are not sufficiently accomplished, which reduces the flight distance. In addition, the impact force at the time of hitting is large, and soft and good shot feel is not sufficiently obtained. When the hardness difference is too large, the durability is poor. Therefore, the upper limit of the hardness difference is preferably 40, more preferably 35.

In the golf ball of the present invention, it is desired for the core 1 to have a central point hardness in Shore D hardness of 30 to 50, preferably 32 to 48, more preferably 35 to 45. When the central point hardness is lower than 30, the core is too soft, and the rebound characteristics of the resulting golf ball are degraded. On the other hand, when the central point hardness is higher than 50, the core is too hard, and the shot feel of the resulting golf ball is poor. In addition, the launch angle is small and the spin amount is large, which reduces the flight distance of the resulting golf ball. The term "a central point hardness of the core 1" as used herein refers to the hardness, which is obtained by cutting the core into two equal parts and then measuring a hardness at the central point in section.

In the golf ball of the present invention, it is desired for the core 1 to have a surface hardness in Shore D hardness of 45 to 65, preferably 50 to 62, more preferably 55 to 60. When the hardness is lower than 45, the core is too soft, and the rebound characteristics of the resulting golf ball are degraded. In addition, the launch angle is small and the spin amount is large, which reduces the flight distance of the resulting golf ball. On the other hand, when the hardness is higher than 65, the core is too hard, and the shot feel of the resulting golf ball is poor. The term "a surface hardness of the core" as used herein refers to the hardness, which is determined by measuring a hardness at the surface of the resulting core.

Figure 2:
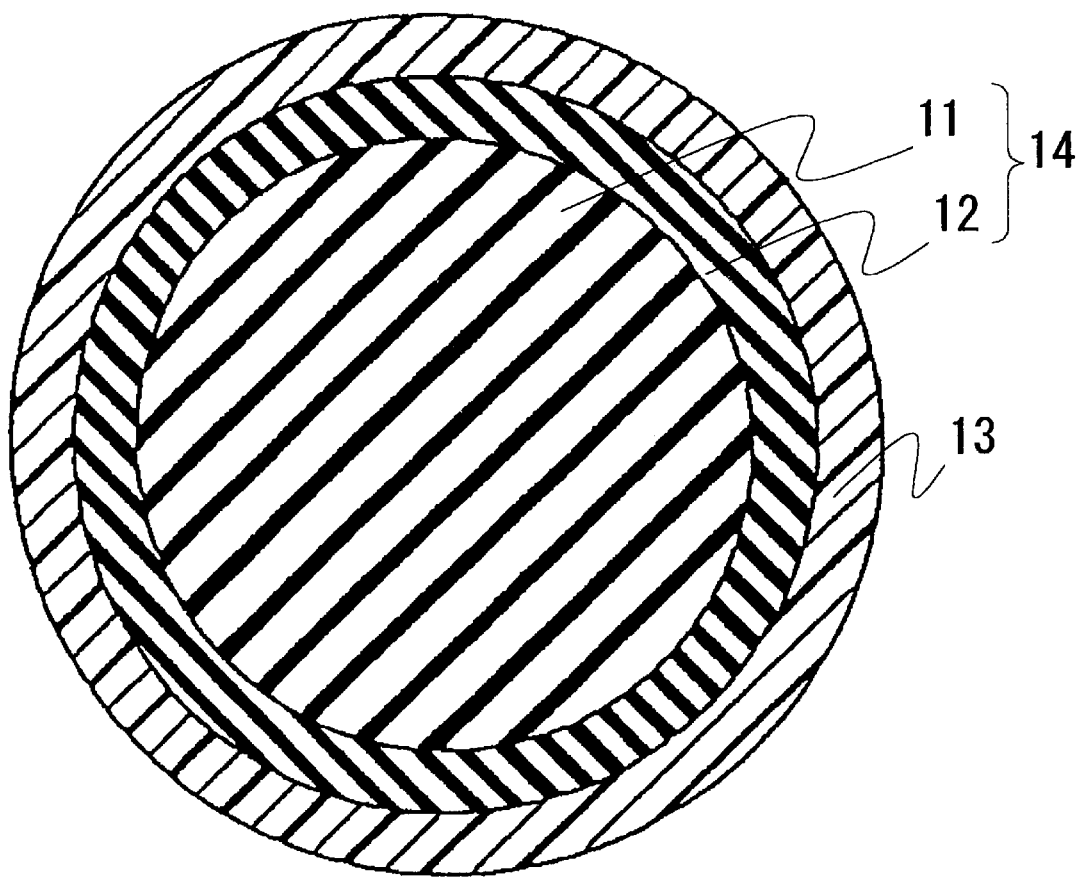
FIG. 2 is a schematic cross section illustrating another embodiment of the golf ball of the present invention.

In the golf ball of the present invention, the core 1 may have a single-layered structure or multi-layered structure, which has two or more layers, as described above. When the core has a multi-layered structure, which has two or more layers, the solid golf ball of the present invention will be explained with reference to the accompanying drawing in detail. FIG. 2 is a schematic cross section illustrating another embodiment of the solid golf ball of the present invention. As shown in FIG. 2, the golf ball of the present invention comprises a core 14 composed of a center 11 and at least one layer of an intermediate layer 12 formed on the center, and a cover 13 formed on the core. In order to explain the golf ball of the present invention simply, a golf ball having single-layer structured intermediate layer 12, i.e. three-piece solid golf ball, will be used hereinafter for explanation. However, the golf ball of the present invention may be applied for the golf ball having two or more layers of core.

In the golf ball of the present invention, the center 11, which is the inmost layer of the core 14, is preferably formed from the rubber composition as described above.

In the golf ball of the present invention, it is desired for the center 11 to have a diameter of 30.0 to 41.0 mm, preferably 31.0 to 40.2 mm, more preferably 31.2 to 39.8 mm. When the diameter of the center 11 is smaller than 30.0 mm, the intermediate layer is thick, and a desired hardness distribution is not obtained. On the other hand, when the diameter is larger than 41.0 mm, the thickness of the intermediate layer or cover is too thin, and it is difficult to mold it.

In the golf ball of the present invention, it is required that a surface hardness in Shore D hardness of the center 11 be higher than a central point hardness in Shore D hardness of the center by not less than 15, and the hardness difference is within the range of preferably 15 to 25, more preferably 16 to 23. When the hardness difference is lower than 15, the impact force at the time of hitting is large, and soft and good shot feel is not sufficiently obtained. When the hardness difference is too large, the surface hardness of the center is harder than the hardness of the intermediate layer, and a desired flight performance is not obtained. Therefore, the upper limit of the hardness difference is preferably 25, more preferably 23.

In the golf ball of the present invention, it is desired for the center 11 to have a central point hardness in Shore D hardness of 30 to 50, preferably 35 to 48, more preferably 38 to 45. When the central point hardness is lower than 30, the center is too soft, and the rebound characteristics of the resulting golf ball are degraded. In addition, the shot feel is heavy and poor. On the other hand, when the central point hardness is higher than 50, the center is too hard, and the shot feel of the resulting golf ball is hard and poor. The term "a central point hardness of the center 11" as used herein refers to the hardness, which is obtained by cutting the center into two equal parts and then measuring a hardness at the central point in section.

In the golf ball of the present invention, it is desired for the center 11 to have a surface hardness in Shore D hardness of 45 to 60, preferably 48 to 58, more preferably 50 to 55. When the surface hardness is lower than 45, the center is too soft, and the rebound characteristics of the resulting golf ball are degraded. On the other hand, when the hardness is higher than 65, the center is too hard, the hardness difference from the intermediate layer is not sufficiently obtained, and a desired launch angle and spin amount are not obtained. The term "a surface hardness of the center 11" as used herein refers to the hardness, which is determined by measuring a hardness at the surface of the resulting center 11.

In the golf ball of the present invention, it is desired for the center to have a deformation amount when applying from an initial load of 98 N to a final load of 1275 N of 2.80 to 4.00 mm, preferably 2.80 to 3.80 mm, more preferably 2.90 to 3.50 mm. When the deformation amount is smaller than 2.80 mm, the center is too hard, and the shot feel of the resulting golf ball is hard and poor. On the other hand, when the deformation amount is larger than 4.00 mm, the center is too soft, and the shot feel of the resulting golf ball is heavy and poor. The intermediate layer 12 is then formed on the center 11 to form the core 14.

It is desired that the core 14 of the golf ball of the present invention have a diameter of 40.8 to 42.2 mm, preferably 41.0 to 42.0 mm, more preferably 41.2 to 41.8 mm. When the diameter of the core 14 is smaller than 40.8 mm, the cover 13 is thick, and the rebound characteristics are degraded. In addition, the hardness difference in the core is not sufficiently obtained. On the other hand, when the diameter of the core 14 is larger than 42.2 mm, the cover is too thin, and the technical effects accomplished by the presence of the cover is not sufficiently obtained. In addition, it is difficult to mold it.

In the golf ball of the present invention, it is desired that a surface hardness in Shore D hardness of the core 14 (that is, a surface hardness of the intermediate layer 12) be higher than a central point hardness in Shore D hardness of the center 11 by not less than 20, and the hardness difference is within the range of preferably 20 to 40, more preferably 23 to 35. When the hardness difference is lower than 20, high launch angle and low spin amount are not sufficiently accomplished, which reduces the flight distance. When the hardness difference is too large, the core is cracked by deformation at the time of hitting, and the durability is poor. Therefore, the upper limit of the hardness difference is preferably 40.

In the golf ball of the present invention, it is desired that the surface hardness of the core 14 be higher than the surface hardness of the center 11, and the hardness difference is within the range of preferably 3 to 10, more preferably 4 to 9. When the surface hardness of the core 14 is not more than the surface hardness of the center 11, the hardness difference from the center is small, and a desired launch angle and spin amount are not obtained, which reduces the flight distance.

In the golf ball of the present invention, it is desired for the core 14 to have a surface hardness in Shore D hardness of 55 to 75, preferably 58 to 70, more preferably 60 to 65. When the hardness is lower than 55, a desired launch angle and spin amount are not obtained, which reduces the flight distance of the resulting golf ball. On the other hand, when the hardness is higher than 75, the durability of the core is poor, and cracks occur. The term "a surface hardness of the core 14" as used herein refers to the hardness, which is determined by measuring a hardness at the surface of the core 14 obtained by forming the intermediate layer 12 on the center 11.

In the golf ball of the present invention, it is desired for the core 14 to have a deformation amount when applying from an initial load of 98 N to a final load of 1275 N of 2.70 to 3.50 mm, preferably 2.80 to 3.40 mm, more preferably 2.90 to 3.30 mm. When the deformation amount is smaller than 2.70 mm, the core is too hard, and the shot feel of the resulting golf ball is hard and poor. On the other hand, when the deformation amount is larger than 3.50 mm, the core is too soft, and the shot feel of the resulting golf ball is heavy and poor.

In the golf ball of the present invention, the materials used in the intermediate layer 12 are not limited as long as the above hardness distribution is obtained, but may be the rubber composition as used in the center 11, which comprises cis-1,4-polybutadiene as a base rubber, or thermoplastic resin, such as ionomer resin, thermoplastic elastomer or the mixture thereof. Preferred is the rubber composition or ionomer resin, because it imparts high rebound characteristics to the resulting golf ball.

The ionomer resin, which can be typically used for the cover of golf balls, may be a copolymer of α-olefin and α,β-unsaturated carboxylic acid, of which a portion of carboxylic acid groups is neutralized with metal ion; a terpolymer of α-olefin, α,β-unsaturated carboxylic acid and α,β-unsaturated carboxylic acid ester, of which a portion of carboxylic acid groups is neutralized with metal ion; or mixtures thereof. Examples of the α-olefins in the ionomer preferably include ethylene, propylene and the like. Examples of the α,β-unsaturated carboxylic acid in the ionomer include acrylic acid, methacrylic acid, fumaric acid, maleic acid, crotonic acid and the like, and preferred are acrylic acid and methacrylic acid. Examples of the α,β-unsaturated carboxylic acid ester in the ionomer include methyl ester, ethyl ester, propyl ester, n-butyl ester and isobutyl ester of acrylic acid, methacrylic acid, fumaric acid, maleic acid, crotonic acid and the like. Preferred are acrylic acid esters and methacrylic acid esters. The metal ion which neutralizes a portion of carboxylic acid groups of the copolymer or terpolymer includes an alkali metal ion, such as a sodium ion, a potassium ion, a lithium ion and the like; a divalent metal ion, such as a zinc ion, a calcium ion, a magnesium ion and the like; a trivalent metal ion, such as an aluminum ion, a neodymium ion and the like; and mixture thereof. Preferred are sodium ions, zinc ions, lithium ions and the like, in view of rebound characteristics, durability and the like.

The ionomer resin is not limited, but examples thereof will be shown by a trade name thereof. Examples of the ionomer resins, which are commercially available from Mitsui Du Pont Polychemical Co., Ltd. include Hi-milan 1555, Hi-milan 1557, Hi-milan 1601, Hi-milan 1605, Hi-milan 1652, Hi-milan 1702, Hi-milan 1705, Hi-milan 1706, Hi-milan 1707, Hi-milan 1855, Hi-milan 1856, Hi-milan AM7316 and the like. Examples of the ionomer resins, which are commercially available from Du Pont Co., include Surlyn 9945, Surlyn 8945, Surlyn 6320, Surlyn 8320, Surlyn AD8511, Surlyn AD8512, Surlyn AD8542 and the like. Examples of the ionomer resins, which are commercially available from Exxon Chemical Co., include Iotek 7010, Iotek 8000 and the like. These ionomer resins may be used alone or in combination.

As the materials suitably used in the intermediate layer 12 of the present invention, the above ionomer resin may be used alone, but the ionomer resin may be used in combination with at least one of thermoplastic elastomer, diene-based block copolymer and the like.

Examples of the thermoplastic elastomers include polyamide-based thermoplastic elastomer, which is commercially available from Atofina Japan Co., Ltd. under the trade name of "Pebax" (such as "Pebax 2533"); polyester-based thermoplastic elastomer, which is commercially available from Toray-Do Pont Co., Ltd. under the trade name of "Hytrel" (such as "Hytrel 3548", "Hytrel 4047"); polyurethane-based elastomer, which is commercially available from Takeda Badishes Urethanes Industries, Ltd. under the trade name of "Elastollan" (such as "Elastollan ET880"); and the like.

The diene-based block copolymer is a block copolymer or partially hydrogenated block copolymer having double bond derived from conjugated diene compound. The base bock copolymer is block copolymer composed of block polymer block A mainly comprising at least one aromatic vinyl compound and polymer block B mainly comprising at least one conjugated diene compound. The partially hydrogenated block copolymer is obtained by hydrogenating the block copolymer. Examples of the aromatic vinyl compounds comprising the block copolymer include styrene, α-methyl styrene, vinyl toluene, p-t-butyl styrene, 1,1-diphenyl styrene and the like, or mixtures thereof. Preferred is styrene. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof. Examples of the diene block copolymers include an SBS (styrene-butadiene-styrene) block copolymer having polybutadiene block with epoxy groups or SIS (styrene-isoprene-styrene) block copolymer having polyisoprene block with epoxy groups and the like. Examples of the diene block copolymers which is commercially available include the diene block copolymers, which are commercially available from Daicel Chemical Industries, Ltd. under the trade name of "Epofriend" (such as "Epofriend A1010"), the diene block copolymers, which are commercially available from Kuraray Co., Ltd. under the trade name of "Septon" (such as "Septon HG-252") and the like.

The amount of the thermoplastic elastomer or diene block copolymer is 1 to 60 parts by weight, preferably 1 to 35 parts by weight, based on 100 parts by weight of the base resin for the intermediate layer. When the amount is smaller than 1 part by weight, the technical effect of improving the shot feel of the golf ball is not sufficiently obtained. On the other hand, when the amount is larger than 60 parts by weight, the intermediate layer is too soft, and the rebound characteristics of the resulting golf ball are degraded. In addition, the compatibility with the ionomer resin is degraded, and the durability is degraded.

When the intermediate layer 12 is formed from rubber composition, the rubber composition for the intermediate layer is mixed, and coated on the center 11 into a concentric sphere, and then vulcanized by press-molding at 160 to 180° C. for 10 to 20 minutes in the mold to obtain a core 14, which is formed by covering the intermediate layer 12 on the center 11. When the intermediate layer 12 is formed from thermoplastic resin, the resin composition for the intermediate layer is directly injection molded on the center 11 to obtain the core 14. It is preferable for the surface of the resulting core 14 to be buffed to improve the adhesion to the cover formed on the core.

The cover 13 is then covered on the core 14 (or the cover 2 is then covered on the core 1). In the golf ball of the present invention, it is required for the cover 2, 13 to comprise as a base resin (a) polyurethane-based thermoplastic elastomer formed by using cycloaliphatic diisocyanate, or (b) a mixture of polyurethane-based thermoplastic elastomer formed by using cycloaliphatic diisocyanate and polyamide-based thermoplastic elastomer. The amount of the component (a) or (b) is not less than 50% by weight, preferably not less than 70% by weight, more preferably not less than 90% by weight, most preferably 100% by weight, based on the total weight of the cover.

Polyurethane-based thermoplastic elastomer generally contains polyurethane structure as hard segment and polyester or polyether as soft segment. The polyurethane structure generally contains diisocyanate and curing agent, such as amine-based curing agent. The polyurethane-based thermoplastic elastomer formed by using cycloaliphatic diisocyanate is polyurethane-based thermoplastic elastomer that the diisocyanate is cycloaliphatic diisocyanate.

Examples of the cycloaliphatic diisocyanates include one or combination of two or more selected from the group consisting of 4,4'-dicyclohexylmethane diisocyanate ($H_{12}$MDI), which is hydrogenated compound of MDI; 1,3-bis (isocyanatomethyl) cyclohexane ($H_6$XDI), which is hydrogenated compound of XDI; isophorone diisocyanate (IPDI); and trans-1,4-cyclohexane diisocyanate (CHDI). Preferred is the $H_{12}$MDI in view of general-purpose properties and processability. Concrete examples of the polyurethane-based thermoplastic elastomer formed by using the H12MDI include polyurethane-based thermoplastic elastomers, which are commercially available from BASF Polyurethane Elastomers Co., Ltd. under the trade name of "Elastollan XNY90A", "Elastollan XNY97A", "Elastollan XNY585", and the like.

The diisocyanates generally include aliphatic diisocyanate and aromatic diisocyanate in addition to the cycloaliphatic diisocyanate. As the polyurethane-based thermoplastic elastomer, preferred are polyurethane-based thermoplastic elastomers formed by using diisocyanate having no double bond in backbone structure in molecule, that is, aliphatic diisocyanate and cycloaliphatic diisocyanate in view of yellowing resistance. Preferred are polyurethane-based thermoplastic elastomers formed by using cycloaliphatic diisocyanate and aromatic diisocyanate, which have high mechanical strength, in view of scuff resistance. Therefore, in the cover used for the golf ball of the present invention, preferred is polyurethane-based thermoplastic elastomer formed by using cycloaliphatic diisocyanate in view of both the yellowing resistance and scuff resistance.

Polyamide-based thermoplastic elastomer generally contains polyamide as hard segment and polyether or polyester as soft segment. The polyamide-based thermoplastic elastomer used for the cover 2, 13 of the golf ball of the present invention may be polyether-polyamide-based thermoplastic elastomer or polyester-polyamide-based thermoplastic elastomer. Preferred is polyether-polyamide-based thermoplastic elastomer. Concrete examples of the polyether-polyamide-based thermoplastic elastomer include polyamide-based thermoplastic elastomer, which is commercially available from Atofina Japan Co., Ltd. under the trade name of "Pebax 5533SN00", and the like.

The blend ratio (u:a) of the polyurethane-based thermoplastic elastomer (u) to the polyamide-based thermoplastic elastomer (a) in the mixture is 100:0 to 70:30, preferably 98:2 to 80:20, more preferably 95:5 to 90:10. When the amount of the polyamide-based thermoplastic elastomer is larger than 30% by weight, the scuff resistance of the resulting golf ball is degraded.

In the golf ball of the present invention, the base resin for the cover may include polystyrene-based thermoplastic elastomer, polyester-based thermoplastic elastomer, polyolefin-based thermoplastic elastomer, nylon resin and the like in addition to the above thermoplastic elastomers.

The cover composition used in the present invention may optionally contain pigments (such as titanium dioxide, etc.) and the other additives such as a dispersant, an antioxidant, a UV absorber, a photostabilizer and a fluorescent agent or a fluorescent brightener, etc., in addition to the above resin component as long as the addition of the additives does not deteriorate the desired performance of the golf ball cover. If used, the amount of the pigment is preferably 0.1 to 5 parts by weight, based on 100 parts by weight of the base resin for the cover.

A method of covering on the core with the cover is not specifically limited, but may be a conventional method. For example, there can be used a method comprising molding the cover composition into a semi-spherical half-shell in advance, covering the core with the two half-shells, followed by press molding at 160 to 200° C. for 1 to 10 minutes, or a method comprising injection molding the cover composition directly on the core, which is covered with the cover, to cover it. Preferred is a method comprising press molding in order to obtain a golf ball shaped into a true sphere.

In the golf ball of the present invention, it is required for the cover 2, 13 to have a thickness of not more than 1.0 mm, preferably 0.3 to 1.0 mm, more preferably 0.5 to 0.9 mm. When the thickness is larger than 1.0 mm, the cover is too thick, and the rebound characteristics of the resulting golf ball are degraded, which reduces the flight distance. When the thickness is too thin, the technical effects accomplished by the presence of the cover are not sufficiently obtained, and it is difficult to mold the cover such that the resulting golf ball is shaped into a true sphere. Therefore the thickness of the cover is preferably not less than 0.3 mm.

In golf ball of the present invention, it is desired for the cover 2, 13 to have a Shore D hardness of 35 to 60, preferably 40 to 50, more preferably 42 to 50. When the hardness is lower than 35, the cover is too soft, and the rebound characteristics are degraded. On the other hand, when the hardness is higher than 60, the cover is too hard, and the shot feel is hard and poor. The term "a hardness of the cover" as used herein refers to the hardness measured using a sample of a heat and press molded sheets from the cover composition.

At the time of molding the cover, many depressions called "dimples" may be optionally formed on the surface of the golf ball. Furthermore, paint finishing or marking with a stamp may be optionally provided after the cover molded for commercial purposes.

In the golf ball of the present invention, it is desired to have a deformation amount when applying from an initial load of 98 N to a final load of 1275 N of 2.50 to 3.20 mm, preferably 2.60 to 3.10 mm, more preferably 2.70 to 3.00 mm. When the deformation amount is smaller than 2.50 mm, the golf ball is too hard, and the shot feel is hard and poor. On the other hand, when the deformation amount is larger than 3.20 mm, the golf ball is too soft, and the shot feel is heavy and poor.

The golf ball of the present invention is formed, so that it has a diameter of not less than 42.67 mm (preferably 42.67 to 43 mm) and a weight of not more than 45.93 g, in accordance with the regulations for golf balls.

EXAMPLES

The following Examples and Comparative Examples further illustrate the present invention in detail but are not to be construed to limit the scope of the present invention.

Production of Core (A) Single-layer Structured Core

The rubber compositions for the core having the formulations shown in Table 1 were mixed, and then vulcanized by press-molding in the mold at the vulcanization condition shown in the same Table to obtain spherical cores. The diameter, deformation amount, central point hardness (1a) and surface hardness (1b) of the resulting core were measured, and the hardness difference (1b-1a) was determined by calculation. The results are shown in the same Table.

TABLE 1

| Core composition | | I | II | III | IV | V |
|---|---|---|---|---|---|---|
| BR-18 *1 | | 100 | 100 | 100 | 100 | 100 |
| Zinc acrylate | | 33 | 33 | 33 | 33 | 33 |
| Zinc oxide | | 12.0 | 12.5 | 12.0 | 12.0 | 11.5 |
| Diphenyl disulfide *2 | | 0.5 | 0.5 | 0.5 | 0.5 | 0.5 |
| Dicumyl peroxide *3 | | 1.0 | 1.0 | 1.0 | 1.0 | 1.0 |
| Vulcanization condition | | | | | | |
| The first stage | Temp. (° C.) | 170 | 170 | 140 | 150 | 170 |
|  | Time (min) | 15 | 15 | 20 | 30 | 15 |
| The second stage | Temp. (° C.) | — | — | 165 | — | — |
|  | Time (min) | — | — | 8 | — | — |
| Diameter of core (mm) | | 41.2 | 41.8 | 41.2 | 41.2 | 40.0 |
| Deformation amount of core (mm) | | 2.95 | 3.00 | 2.70 | 3.25 | 2.85 |
| Core hardness (Shore D) | | | | | | |
| Central point hardness (1a) | | 39 | 36 | 52 | 44 | 39 |
| Surface hardness (1b) | | 59 | 60 | 55 | 54 | 57 |
| Hardness difference (1b − 1a) | | 20 | 24 | 3 | 10 | 18 |

*1: High-cis polybutadiene commercially available from JSR Co., Ltd., under the trade name "BR-18" (Content of cis-1,4-polybutadiene = 96%)
*2: Diphenyl disulfide available from Sumitomo Seika Co., Ltd.
*3: Dicumyl peroxide, commercially available from Nippon Oil & Fats Co., Ltd. under the trade name of "Percumyl D"

(B) Two-layer Structured Core (1) Production of Center

The rubber composition for the center having the formulation shown in Table 2 was mixed, and then vulcanized by press-molding in the mold at the vulcanization condition shown in the same Table to obtain spherical center. The diameter, deformation amount, central point hardness (2a) and surface hardness (2b) of the resulting center were measured, and the hardness difference (2b-2a) was determined by calculation. The results are shown in the same Table.

TABLE 2

| Center composition (parts by weight) | | VI | VII | VIII |
|---|---|---|---|---|
| BR-18 *1 | | 100 | 100 | 100 |
| Zinc acrylate | | 33 | 33 | 30 |
| Zinc oxide | | 11.5 | 11.5 | 12.5 |
| Diphenyl disulfide *2 | | 0.5 | 0.5 | 0.5 |
| Dicumyl peroxide *3 | | 0.8 | 0.8 | 0.8 |
| Vulcanization condition | | | | |
| The first stage | Temp. (° C.) | 170 | 170 | 140 |
|  | Time (min) | 15 | 15 | 20 |
| The second stage | Temp. (° C.) | — | — | 165 |
|  | Time (min) | — | — | 8 |
| Diameter of center (mm) | | 33.6 | 39.4 | 33.6 |

TABLE 2-continued

| Center composition (parts by weight) | VI | VII | VIII |
|---|---|---|---|
| Center hardness (Shore D) | | | |
| Central point hardness (2a) | 33 | 37 | 47 |
| Surface hardness (2b) | 52 | 58 | 50 |
| Hardness difference (2b − 2a) | 19 | 21 | 3 |
| Deformation amount of center (mm) | 3.50 | 2.95 | 3.40 |

*1: High-cis polybutadiene commercially available from JSR Co., Ltd., under the trade name "BR-18" (Content of cis-1,4-polybutadiene = 96%)
*2: Diphenyl disulfide available from Sumitomo Seika Co., Ltd.
*3: Dicumyl peroxide, commercially available from Nippon Oil & Fats Co., Ltd. under the trade name of "Percumyl D" (2) Production of two-layer structured core (Formation of Intermediate layer) Intermediate layer composition (i) and (ii)

The rubber composition for the intermediate layer having the formulation shown in Table 2-2 was mixed, and coated on the center produced in the step (1) into a concentric sphere, and then vulcanized by press-molding in the mold at the vulcanization condition shown in the same Table to obtain two-layer structured core.

Intermediate Layer Composition (iii)

The composition for the intermediate layer having the formulation shown in Table 3 was directly injection molded on the center produced in the step (1) to obtain two-layer structured core. The diameter, deformation amount and surface hardness (2c) of the resulting two-layer structured core were measured, and the hardness difference (2c-2a) was determined by calculation. The results are shown in Tables 7 and 8.

TABLE 3

| Intermediate layer composition (parts by weight) | | i | ii | iii |
|---|---|---|---|---|
| BR-18 *1 | | 80 | 80 | — |
| BR-10 *4 | | 20 | 20 | — |
| Zinc acrylate | | 37 | 35 | — |
| Zinc oxide | | 10.5 | 11.0 | — |
| Dicumyl peroxide *3 | | 0.7 | 0.7 | — |
| Hi-milan 1605 *5 | | — | — | 60 |
| Hi-milan 1706 *6 | | — | — | 40 |
| Vulcanization condition | Temp. (° C.) | 170 | 170 | — |
| | Time (min) | 16 | 16 | — |

*4: High-cis polybutadiene commercially available from JSR Co., Ltd., under the trade name "BR-10" (Content of cis-1,4-polybutadiene = 96%)
*5: Hi-milan 1605 (trade name), ethylene-methacrylic acid copolymer ionomer resin obtained by neutralizing with sodium ion, manufactured by Du Pont-Mitsui Polychemicals Co., Ltd.
*6: Hi-milan 1706 (trade name), ethylene-methacrylic acid copolymer ionomer resin obtained by neutralizing with zinc ion, manufactured by Du Pont-Mitsui Polychemicals Co., Ltd.

Preparation of Cover Compositions

The formulation materials for the cover showed in Table 4 were mixed using a kneading type twin-screw extruder to obtain pelletized cover compositions. The extrusion condition was, a screw diameter of 45 mm,
a screw speed of 200 rpm,
a screw L/D of 35.

The formulation materials were heated at 200 to 260° C. at the die position of the extruder. The hardness were determined, using a sample of a stack of the three or more heat and press molded sheets having a thickness of about 2 mm from the cover composition, which had been stored at 23° C. for 2 weeks, with a Shore D hardness meter according to ASTM D 2240-68. The results are shown as a cover hardness in Tables 4 to 8.

TABLE 4

| Cover composition | A | B | C | D | E | F | G |
|---|---|---|---|---|---|---|---|
| | | | | | (parts by weight) | | |
| Elastollan XNY90A *7 | 100 | 50 | 40 | — | — | — | — |
| Elastollan XNY97A *8 | — | 50 | 40 | — | — | — | — |
| Elastollan ET890 *9 | — | — | — | 100 | — | — | — |
| Pebax 5533SNOO *10 | — | — | 20 | — | 20 | — | — |
| Pandex T-1198 *11 | — | — | — | — | 80 | 100 | — |
| Hi-milan 1605 *5 | — | — | — | — | — | — | 50 |
| Surlyn 9320 *12 | — | — | — | — | — | — | 50 |
| Titanium dioxide | 4 | 4 | 4 | 4 | 4 | 4 | 4 |
| Cover hardness (Shore D) | 46 | 47 | 48 | 48 | 52 | 51 | 50 |

*7: Elastollan XNY90A (trade name), polyurethane-based thermoplastic elastomer formed by using 4,4'-dicyclohexylmethane diisocyanate (H12MDI) (=hydrogenated MDI), commercially available from BASF Polyurethane Elastomers Co., Ltd.; Shore A hardness = 90
*8: Elastollan XNY97A (trade name), polyurethane-based thermoplastic elastomer formed by using 4,4'-dicyclohexylmethane diisocyanate (H12MDI) (=hydrogenated MDI), commercially available from BASF Polyurethane Elastomers Co., Ltd.; Shore A hardness = 97
*9: Elastollan ET890 (trade name), polyurethane-based thermoplastic elastomer formed by using 4,4'-diphenylmethane diisocyanate (MDI), commercially available from BASF Polyurethane Elastomers Co., Ltd.
*10: Pebax 5533SNOO (trade name), polyether-polyamide-based thermoplastic elastomer, commercially available from Elf Atochem Japan Co., Ltd.; Shore D hardness = 55
*11: Pandex T-11890 (trade name), polyurethane-based thermoplastic elastomer formed by using hexamethylene diisocyanate (HDI), commercially available from Dainippon Ink & Chemicals Inc.
*12: Surlyn 9320 (trade name), ethylene-methacrylic acrylic ester terpolymer ionomer resin obtained by neutralizing with zinc ion, manufactured by Du Pont Co.

Examples 1 to 12 and Comparative Examples 1 to 12

The resulting cover compositions were preliminary shaped into semi-spherical half-shells by injection molding, encapsulating the resulting core with the two half-shells, followed by press-molding in the mold at 170° C. for 2 minutes to form a cover layer having the thickness shown in Tables 5 and 7 (Examples) and Tables 6 and 8 (Comparative Examples). Then, clear paint was coated on the surface of the cover layer to obtain a golf ball having a diameter of 42.8 mm and a weight of 45.4 g. With respect to the resulting golf balls, the deformation amount, coefficient of restitution, flight performance (launch angle, spin amount and flight distance), scuff resistance and yellowing resistance were measured or evaluated. The results are shown in Tables 5 and 7 (Examples) and Tables 6 and 8(Comparative Examples). The test methods are as follows.

Test Method

(1) Deformation Amount

The deformation amount is determined by measuring a deformation amount, when applying from an initial load of 98 N to a final load of 1275 N on the center, core or golf ball.

(2) Hardness

(i) Center Hardness

The surface hardness of the center was determined by measuring a Shore D hardness at the surface of the resulting center. The central point hardness of the center was determined by cutting the resulting center into two equal parts and then measuring a Shore D hardness at its central point in section.

(ii) Core Hardness

The surface hardness of the core was determined by measuring a Shore D hardness at the surface of the resulting core obtained by forming the intermediate layer on the center.

(iii) Cover Hardness

The cover hardness was determined by measuring a Shore D hardness, using a sample of a stack of the three or more heat and press molded sheets having a thickness of about 2 mm from the cover composition, which had been stored at 23° C. for 2 weeks. The Shore D hardness was measured using a Shore D hardness meter according to ASTM D 2240.

(3) Coefficient of Restitution

An aluminum cylinder having a weight of 200 g was struck at a speed of 45 m/sec against a golf ball, and the velocity of the cylinder and the golf ball after the strike were measured. The coefficient of restitution of the golf ball was calculated from the velocity and the weight of both the cylinder and the golf ball. The measurement was conducted 5 times for each golf ball, and the average is shown as the coefficient of restitution of the golf ball.

(4) Flight Performance

A No. 1 wood club (W#1, a driver) having metal head was mounted to a swing robot manufactured by True Temper Co. and the resulting golf ball was hit at a head speed of 50 m/second, the flight distance was measured. As the flight distance, total that is a distance to the stop point of the hit golf ball was measured, and is indicated by an index when that of Example 1 is 100. The measurement was conducted 12 times for each golf ball (n=5), and the average is shown as the result of the golf ball.

(5) Yellowing Resistance

The resulting golf ball was expose to a sunshine weather meter manufactured by Suga Test Instruments Co., Ltd. for 120 hours. The Lab color difference ($\Delta L$, $\Delta a$ and $\Delta b$) of the surface of the golf ball between before and after the exposure was measured by using a color-difference-colorimeter, which is commercially available from Minolta Co., Ltd. under the trade name "CR-221", and was represented by $\Delta E$. The $\Delta E$ is determined by using the following formula:

$$\Delta E = [(\Delta L)^2 + (\Delta a)^2 + (\Delta b)^2]^{1/2}$$

The larger the value of color difference $\Delta E$ is, the less the yellowing resistance is.

(6) Scuff Resistance

After a pitching wedge (PW) commercially available was mounted to a swing robot manufactured by True Temper Co., two points on the surface of each golf ball was hit at a head speed of 36 m/sec one time for each point. The two points were evaluated by checking the surface appearance by visual observation. The evaluation criteria are as follows.

Evaluation Criteria

○: The surface of the golf ball slightly has a cut, but it is not particularly noticeable.

Δ: The surface of the golf ball clearly has a cut, and the surface becomes fluffy.

x: The surface of the golf ball is considerably chipped off, and the surface noticeably becomes fluffy.

Test Results

TABLE 5

| Test item | Example No. | | | | |
|---|---|---|---|---|---|
| | 1 | 2 | 3 | 4 | 5 |
| (Core) | | | | | |
| Composition | I | I | I | II | I |
| Diameter (mm) | 41.2 | 41.2 | 41.2 | 41.8 | 41.8 |
| Deformation amount (mm) | 2.95 | 2.95 | 2.95 | 3.00 | 3.00 |
| Hardness difference (1b − 1a) | 20 | 20 | 20 | 24 | 24 |
| (Cover) | | | | | |
| Composition | A | B | C | B | C |
| Hardness (Shore D) | 46 | 47 | 48 | 47 | 48 |
| Thickness (mm) | 0.8 | 0.8 | 0.8 | 0.5 | 0.5 |
| (Golf ball) | | | | | |
| Deformation amount (mm) | 2.90 | 2.85 | 2.80 | 2.98 | 2.92 |
| Coefficient of restitution | 100 | 101 | 102 | 101 | 102 |
| Launch angle (degree) | 10.5 | 10.6 | 10.7 | 10.9 | 10.8 |
| Spin amount (rpm) | 2800 | 2750 | 2700 | 2680 | 2650 |
| Flight distance | 100 | 102 | 103 | 103 | 104 |
| Scuff resistance | ○ | ○ | ○ | ○ | ○ |
| Yellowing resistance ($\Delta E$) | ○ | ○ | ○ | ○ | ○ |

TABLE 6

| Test item | Comparative Example No. | | | | | |
|---|---|---|---|---|---|---|
| | 1 | 2 | 3 | 4 | 5 | 6 |
| (Core) | | | | | | |
| Composition | I | I | I | III | IV | V |
| Diameter (mm) | 41.2 | 41.2 | 41.2 | 41.2 | 41.2 | 40 |
| Deformation amount (mm) | 2.95 | 2.95 | 2.95 | 2.70 | 3.25 | 2.85 |
| Hardness difference (1b − 1a) | 20 | 20 | 20 | 3 | 10 | 18 |
| (Cover) | | | | | | |
| Composition | D | E | F | B | B | B |
| Hardness (Shore D) | 48 | 52 | 50 | 47 | 47 | 47 |
| Thickness (mm) | 0.8 | 0.8 | 0.8 | 0.8 | 0.8 | 1.4 |
| (Golf ball) | | | | | | |
| Deformation amount (mm) | 2.90 | 2.80 | 2.75 | 2.65 | 3.20 | 2.60 |
| Coefficient of restitution | 97 | 98 | 96 | 99 | 96 | 95 |
| Launch angle (degree) | 10.1 | 10.0 | 10.1 | 10.0 | 10.3 | 10.1 |
| Spin amount (rpm) | 2850 | 2630 | 2900 | 2950 | 2800 | 2850 |
| Flight distance | 97 | 98 | 95 | 98 | 97 | 96 |
| Scuff resistance | x | x | x | ○ | ○ | ○ |
| Yellowing resistance ($\Delta E$) | x | ○ | ○ | ○ | ○ | ○ |

TABLE 7

| Test item | Example No. | | | | | | |
|---|---|---|---|---|---|---|---|
| | 6 | 7 | 8 | 9 | 10 | 11 | 12 |
| Center composition (Intermediate layer) | VI | VI | VI | VI | VII | VII | VII |
| Composition | i | i | i | i | iii | iii | iii |
| Thickness (mm) | 3.8 | 3.8 | 3.8 | 4.1 | 0.9 | 0.9 | 1.2 |

TABLE 7-continued

| Test item | Example No. | | | | | | |
|---|---|---|---|---|---|---|---|
| | 6 | 7 | 8 | 9 | 10 | 11 | 12 |
| (Core) | | | | | | | |
| Diameter (mm) | 41.2 | 41.2 | 41.2 | 41.8 | 41.2 | 41.2 | 41.8 |
| Deformation amount (mm) | 2.80 | 2.80 | 2.80 | 2.75 | 2.70 | 2.70 | 2.60 |
| Surface hardness (2c) (Shore D) | 60 | 60 | 60 | 61 | 70 | 70 | 70 |
| Hardness difference (2c − 2a) | 27 | 27 | 27 | 28 | 33 | 33 | 33 |
| (Cover) | | | | | | | |
| Composition | A | B | C | B | B | C | B |
| Hardness (Shore D) | 46 | 47 | 48 | 47 | 47 | 48 | 47 |
| Thickness (mm) | 0.8 | 0.8 | 0.8 | 0.5 | 0.8 | 0.8 | 0.5 |
| (Golf ball) | | | | | | | |
| Deformation amount (mm) | 2.70 | 2.65 | 2.60 | 2.68 | 2.60 | 2.55 | 2.55 |
| Coefficient of restitution | 100 | 101 | 102 | 103 | 103 | 104 | 104 |
| Launch angle (degree) | 10.5 | 10.6 | 10.7 | 10.7 | 10.8 | 10.9 | 10.9 |
| Spin amount (rpm) | 2700 | 2650 | 2600 | 2630 | 2500 | 2450 | 2480 |
| Flight distance | 100 | 101 | 102 | 103 | 103 | 104 | 104 |
| Scuff resistance | ◯ | ◯ | ◯ | ◯ | ◯ | ◯ | ◯ |
| Yellowing resistance (ΔE) | ◯ | ◯ | ◯ | ◯ | ◯ | ◯ | ◯ |

TABLE 8

| Test item | Comparative Example No. | | | | | |
|---|---|---|---|---|---|---|
| | 7 | 8 | 9 | 10 | 11 | 12 |
| Center composition (Intermediate layer) | VI | VI | VI | VI | VII | VIII |
| Composition | i | i | i | i | iii | ii |
| Thickness (mm) | 3.8 | 3.8 | 3.8 | 3.2 | 0.9 | 3.8 |
| (Core) | | | | | | |
| Diameter (mm) | 41.2 | 41.2 | 41.2 | 40.0 | 40.4 | 41.2 |
| Deformation amount (mm) | 2.80 | 2.80 | 2.80 | 2.90 | 2.80 | 3.00 |
| Surface hardness (2c) (Shore D) | 60 | 60 | 60 | 58 | 70 | 57 |
| Hardness difference (2c − 2a) | 27 | 27 | 27 | 25 | 33 | 10 |
| (Cover) | | | | | | |
| Composition | D | E | F | B | B | B |
| Hardness (Shore D) | 48 | 51 | 50 | 47 | 47 | 47 |
| Thickness (mm) | 0.8 | 0.8 | 0.8 | 1.4 | 1.2 | 0.8 |
| (Golf ball) | | | | | | |
| Deformation amount (mm) | 2.65 | 2.68 | 2.60 | 2.80 | 2.70 | 2.85 |
| Coefficient of restitution | 97 | 98 | 96 | 97 | 98 | 98 |
| Launch angle (degree) | 10.1 | 10.2 | 10.1 | 10.1 | 10.3 | 10.1 |
| Spin amount (rpm) | 2700 | 2630 | 2800 | 2850 | 2800 | 2780 |
| Flight distance | 97 | 98 | 96 | 97 | 98 | 98 |
| Scuff resistance | × | × | × | ◯ | ◯ | ◯ |
| Yellowing resistance (ΔE) | × | ◯ | ◯ | ◯ | ◯ | ◯ |

As is apparent from the results of Tables 5 to 8, the golf balls of the present invention of Examples 1 to 12, when compared with the golf balls of Comparative Examples 1 to 12, are superior in rebound characteristics, flight performance, yellowing resistance and scuff resistance.

On the other hand, in the golf balls of Comparative Example 1 and 7, since the polyurethane-based thermoplastic elastomer formed by using aromatic diisocyanate is only used as the base resin for the cover, the scuff resistance is excellent, but the yellowing is very easy to occur and the yellowing resistance is poor.

In the golf ball of Comparative Example 2, the mixture of the polyurethane-based thermoplastic elastomer formed by using aliphatic diisocyanate and the polyamide-based thermoplastic elastomer is used as the base resin for the cover, the yellowing is difficult to occur and the yellowing resistance is excellent, but the scuff resistance is poor.

In the golf balls of Comparative Example 3 and 9, since the ionomer resin is only used as the base resin for the cover, the coefficient of restitution is small and the scuff resistance is poor.

In the golf balls of Comparative Example 4, 5 and 12, since the hardness difference (b-a) between the surface of the core (b) and the central point of the core (or center) (a) is small, high launch angle and low spin amount are not accomplished, which reduces the flight distance.

In the golf balls of Comparative Example 6, 10 and 11, since the thickness of the cover is large, the coefficient of restitution is small, which reduces the flight distance.

In the golf ball of Comparative Example 8, the polyurethane-based thermoplastic elastomer formed by using aliphatic diisocyanate is only used as the base resin for the cover, the yellowing is difficult to occur and the yellowing resistance is excellent, but the scuff resistance is poor.

What is claimed is:

1. A solid golf ball comprising a core and a cover formed on the core, wherein the core is composed of a center and at least one layer of an intermediate layer formed on the center, and wherein
   the cover comprises as a base resin
   (a) polyurethane-based thermoplastic elastomer formed by using cycloaliphatic diisocyanate, or
   (b) a mixture of polyurethane-based thermoplastic elastomer formed by using cycloaliphatic diisocyanate and polyamide-based thermoplastic elastomer, and has a thickness of not more than 1.0 mm,
   a surface hardness in Shore D hardness of the center is higher than a central point hardness in Shore D hardness of the center by not less than 15,
   the surface hardness of the core is higher than the central point hardness of the center by not less than 20, and
   the surface hardness of the core is higher than the surface hardness of the center.

2. The golf ball according to claim 1, wherein the cycloaliphatic diisocyanate is at least one selected from the group consisting of 4,4'-dicyclohexylmethane diisocyanate, 1,3-bis (isocyanatomethyl) cyclohexane, isophorone diisocyanate, and trans-1,4-cyclohexane diisocyanate.

3. The golf ball according to claim 1, wherein the cycloaliphatic diisocyanate is 4,4'-dicyclohexylmethane diisocyanate.

4. The golf ball according to claim 1, wherein the cover has a Shore D hardness of 35 to 60 and the golf ball has a deformation amount when applying from an initial load of 98 N to a final load of 1275 N of 2.50 to 3.20 mm.

5. The golf ball according to claim 1, wherein the cover comprises as a base resin (a) polyurethane-based thermoplastic elastomer formed by using cycloaliphatic diisocyanate.

6. The golf ball according to claim 1, wherein the cover comprises as a base resin (b) a mixture of polyurethane-based thermoplastic elastomer formed by using cycloaliphatic diisocyanate and polyamide-based thermoplastic elastomer.

7. The golf ball according to claim 5, wherein the cycloaliphatic diisocyanate is at least one selected from the group consisting of 4,4'-dicyclohexylmethane diisocyanate, 1,3-bis (isocyanatomethyl) cyclohexane, isophorone diisocyanate, and trans-1,4-cyclohexane diisocyanate.

8. The golf ball according to claim 6, wherein the cycloaliphatic diisocyanate is at least one selected from the group consisting of 4,4'-dicyclohexylmethane diisocyanate, 1,3-bis (isocyanatomethyl) cyclohexane, isophorone diisocyanate, and trans-1,4-cyclohexane diisocyanate.

9. The golf ball according to claim 5, wherein the cycloaliphatic diisocyanate is 4,4'-dicyclohexylmethane diisocyanate.

10. The golf ball according to claim 7, wherein the cycloaliphatic diisocyanate is 4,4'-dicyclohexylmethane diisocyanate.

11. The golf ball according to claim 5, wherein the cover has a Shore D hardness of 35 to 60 and the golf ball has a deformation amount when applying from an initial load of 98 N to a final load of 1275 N of 2.50 to 3.20 mm.

12. The golf ball according to claim 6, wherein the cover has a Shore D hardness of 35 to 60 and the golf ball has a deformation amount when applying from an initial load of 98 N to a final load of 1275 N of 2.50 to 3.20 mm.

13. The golf ball according to claim 1, wherein the blend ratio for the mixture (b) of the polyurethane-based thermoplastic elastomer to the polyamide-based thermoplastic elastomer is 98:2 to 80:20.

14. The golf ball according to claim 6, wherein the blend ratio for the mixture (b) of the polyurethane-based thermoplastic elastomer to the polyamide-based thermoplastic elastomer is 98:2 to 80:20.

15. The golf ball according to claim 1, wherein the blend ratio for the mixture (b) of the polyurethane based thermoplastic elastomer to the polyamide-based thermoplastic elastomer is 95:5 to 90:10.

16. The golf ball according to claim 6 wherein the blend ratio for the mixture (b) of the polyurethane-based thermoplastic elastomer to the polyamide-based thermoplastic elastomer is 95:5 to 90:10.

* * * * *